Dec. 29, 1942. P. H. HEBRON 2,306,945
METHOD OF EDGE CONDITIONING SHEET METAL
Filed July 2, 1942
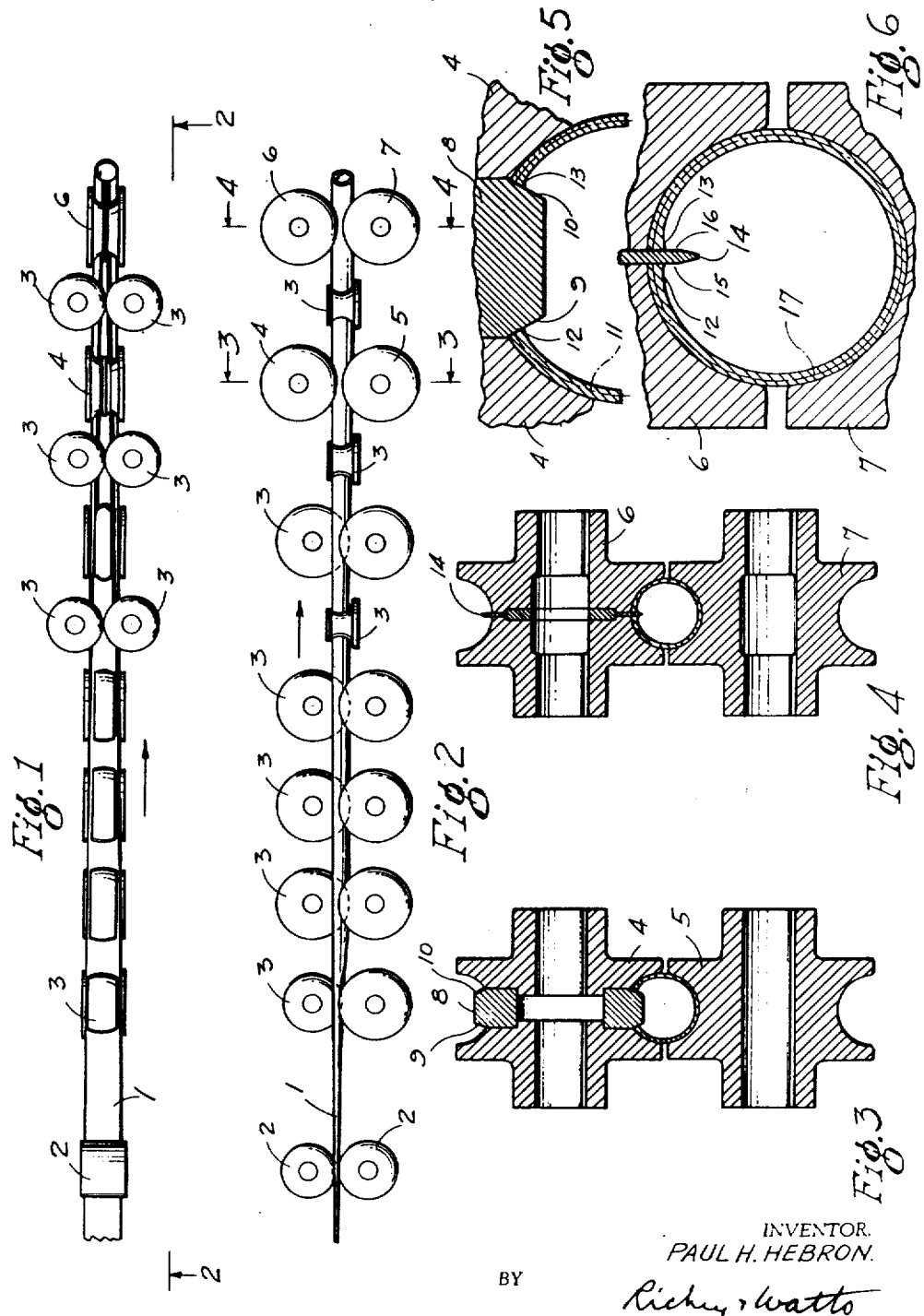
INVENTOR.
PAUL H. HEBRON.
BY Richey & Watts
ATTORNEYS Patented Dec. 29, 1942

2,306,945

UNITED STATES PATENT OFFICE 2,306,945

METHOD OF EDGE CONDITIONING SHEET METAL

Paul H. Hebron, Cleveland, Ohio, assignor to Republic Steel Corporation, Cleveland, Ohio, a corporation of New Jersey Application July 2, 1942, Serial No. 449,450

2 Claims. (Cl. 29—156)

This invention relates to the manufacture of welded or butted pipe or tubing and more particularly to an improved method of preparing the edges of elongated metal strips for welding into tubular form.

In the manufacture of pipe or tubing, it being understood that these terms are used interchangeably in connection with the present invention, it is common practice to pass elongated strips of steel through a series of rolls which progressively form the strip into an open seam tube and then to progressively weld the abutting edges together to make the finished product. Various procedures have been proposed for thickening the edges of the strip in order to provide a greater welding contact, to reduce the danger of improper engagement of the abutting edges, and to increase the strength of the welded joint because of the greater thickness of the metal immediately adjacent the weld.

In order to secure the best welding conditions, particularly in the manufacture of electrically welded tubing, it is important that the edges of the tube abut in the proper manner. In some cases it may be considered advantageous to have the tube edges contact over their entire thickness while in others it may be desired to have the initial point of contact along the outside portions only of the tube edges, and it is among the objects of the present invention to provide means for thickening the strip at the edge surfaces and also accurately to form the edges at the proper angle so that, when they are pressed into contact, the desired engagement will be secured therebetween.

Other objects of my invention include the provision of an improved method for giving the desired edge formation to the strip while it is passing continuously through the tube forming mill; the provision of a simple and effective method of thickening the strip edges which does not require any special upsetting or forging apparatus; the provision of a method for increasing the thickness of the strip edges whereby the outer surface of the tube will retain its cylindrical contour and all of the thickening will occur on the inner wall of the tube.

The above and other objects of my invention will appear from the following description of a preferred apparatus for carrying out my improved method of strip edge conditioning, reference being had to the accompanying drawing, in which—

Figure 1 is a diagrammatic plan view of a series of rolls adapted to form an elongated metal strip into tubular form and to perform my edge conditioning operations.

Figure 2 is a diagrammatic side elevation of the apparatus shown in Figure 1;

Figure 3 is an enlarged vertical cross-sectional view taken on line 3—3 of Figure 2 and illustrating the first pass of the edge forming or conditioning rolls;

Figure 4 is an enlarged view taken on line 4—4 of Figure 2 and illustrating the second pass of edge forming rolls;

Figure 5 is a fragmentary enlarged view of the edge forming fin of the rolls shown in Figure 3;

Figure 6 is a view similar to Figure 5 but illustrating the edge forming fin of the second pass of edge conditioning rolls shown in Figure 4.

The metal strip 1 passes between a pair of entering rolls 2 and then into a series of forming rolls indicated at 3. These rolls are so formed that the moving strip is progressively formed from its original flat condition into tubular shape and are preferably driven by any suitable means, not shown, in order to feed the tube through the forming section into the welding section, which is also omitted from the drawing but which it will be understood, will preferably be positioned immediately following the forming rolls. In order to give the desired edge thickening and edge angle to the strip I provide a pair of rolls 4 and 5, which may be termed the first set of edge conditioning rolls and which are disposed between the last two passes of forming rolls 3. A second set of edge conditioning rolls 6 and 7 is located just beyond the last pass of forming rolls 3.

Although the rolls 4, 5, 6 and 7 have been referred to as edge conditioning rolls, it will be seen that they also serve as forming rolls and effect a certain portion of the bending of the strip into tubular shape. As is best seen in Figure 3, the bottom edge conditioning roll 5 is grooved to accommodate the tube and its coacting top roll 4 is grooved and provided with a radially projecting flange 8. The sides 9 and 10 of the flange 8 are angularly disposed relative to a plane perpendicular to the axes of the rolls. The rolls 4 and 5 are so contoured that what may be termed the contour line, indicated as a dot-dash line at 11 in Figure 5 and which is located midway between the inner and outer surfaces of the strip and extends from the fin surface 9 to the fin surface 10, is shorter than the width of the strip taken on a medial line as the strip enters the first set of edge conditioning rolls.

As the strip passes through the roll pass formed by rolls 4 and 5, the edges abut the angle surfaces 9 and 10 of the fin 8 and are subjected to a great pressure thereby due to the fact that the contour line of the roll pass is smaller than the medial width of the entering strip. This pressure causes an upsetting and thickening of the metal of the strip immediately adjacent the edges as is indicated at 12 and 13 in Figure 5. The groove in the top roll 4 is formed with a smooth surface which causes all of the upsetting or thickening of the edges to occur on the inside of the tube. Due to the pressure exerted against the tube edges as they pass through the rolls 4 and 5 and the burnishing or planishing action caused by engagement of the rotating fin 8 with the tube edges, these edges are caused to conform accurately to the angle of the surfaces 9 and 10 of the fin 8.

The angle between surfaces 9 and 10, as shown in Fig. 5, is substantially the same as the angle between the edge surfaces of the strip just as it enters the pass formed by rolls 4 and 5. As a result those edge surfaces engage for substantially their full radial length with fin surfaces 9 and 10.

It is obvious that the included angle between surfaces 9 and 10 will vary under different conditions of strip thickness and width. Obviously a thin wide strip bent into cylinder-like cross-sectional shape for entry into the pass formed by rolls 4 and 5, will have a different angle between its edge surfaces than would a thick narrow strip. Since, according to the present invention, substantially the entire radial length of the edge surfaces should engage surfaces 9 and 10 it is necessary to employ different angularities of the surfaces with strips of different widths and thicknesses. The edge surfaces of the various sized strips may be suitably beveled or fins having different included angles between surfaces 9 and 10 may be used. By following one or the other or, if desired, both of these procedures the edge surfaces of a strip may be brought into full radial contact with fin surfaces 9 and 10 and the edge portions of the strip may be increased in thickness as described.

After leaving the rolls 4 and 5 the tube passes through another set of forming rolls 3 where the seam is closed to a somewhat greater degree and then enters the second pass of edge conditioning rolls 6 and 7. The bottom roll 7 is contoured to fit the tube while the top roll 6 is provided with a relatively thin flange 14, the sides 15 and 16 of which are formed at an angle which will give exactly the desired angle on the abutting edges of the strip during the welding operation. In the drawings the sides 15 and 16 are shown substantially parallel. The contour line 17 of the rolls 6 and 7 is also made slightly shorter than the medial width dimension of the tube as it enters the roll pass 6—7 so that the tube, when it moves through this last edge conditioning pass, is again subjected to an upsetting pressure against the fin edges 12 and 13 and an additional thickening occurs and also the final and desired angle is imparted to the tube edges.

It will be seen, by reference particularly to Figs. 3 and 5 of the drawing, that the fin 8 is considerably narrower than the width of the strip as obviously it must be if the strip edge portions are to be upset on the inner surfaces when the strip is cylinder-like in cross section. In general the width of the fin ranges from somewhat less to somewhat more than the diameter of the tube whose edges engage opposite sides of the fin 8. In practice the fin usually ranges between about 40% and about 70% of the tube diameter.

I have found, in the actual operation of apparatus embodying my invention, that an increase of approximately .019" may be obtained in the edges of a strip of S. A. E. 1010 and 1020 steel whose original thickness as it entered the forming mill was approximately .110". The amount of edge thickening usually ranges between 3% and 10% using S. A. E. 1010 and 1020 steel, about 5% being common in commercial practice. It will, of course, be understood that greater or less upset and thickening may be secured under varying conditions. This upsetting occurs all on the inner surface of the tube and is sufficient effectively to assist in obtaining consistently satisfactory welding of the seam.

The preceding description of my invention has referred particularly to its use in the production of welded tubing. However, my improved edge thickening method and apparatus may also be used advantageously in the manufacture of unwelded, butted tube as the added edge thickness and smooth, uniform edge surfaces produced by my procedure insure excellent continuity and uniformity of butting conditions and result in an improved product.

This application is a continuation-in-part of my copending application Ser. No. 265,482 filed April 1, 1939.

Although I have described the illustrated embodiment of my invention in some detail it will be understood by those skilled in the art that the apparatus illustrated is shown in a diagrammatic fashion and that extensive modifications and variations might be made in the particular form of apparatus used to carry out my improved method. I do not, therefore, wish to be limited to the specific embodiment of my invention herein shown and described, but claim all forms thereof coming within the scope of the appended claims.

What is claimed is:

1. The method of making a tubular welding blank which includes the steps of moving endwise a strip of steel having substantially parallel side surfaces and edge surfaces substantially perpendicular thereto, progressively bending said moving strip into an open tube which is substantially circular in cross section but with said edge surfaces converging inwardly and being separated by a gap which is of substantial width but not greater than about half the diameter of the tube, and upsetting inwardly and thickening the metal adjacent to said edge surfaces to the extent of at least 5%, said upsetting and thickening being accomplished in a plane transverse of said tube by simultaneously restraining the outer surface of the tube throughout substantially its entire circumferential extent, exerting pressure on the outer surface of the gap-containing part of the tube which, if unresisted, would decrease the width of said gap and applying sufficient force to said edge surfaces to prevent said exteriorly applied force from decreasing the width of said gap and to upset inwardly and thicken the metal adjacent to said edges to the extent specified.

2. The method of making a tubular welding blank which includes the steps of moving endwise a strip of steel having substantially parallel side surfaces and edge surfaces, progressively bending said moving strip into an open tube which is substantially circular in cross section but with said edge surfaces converging inwardly and being separated by a gap which is of substantial width but substantially less than the diameter of the tube, and upsetting inwardly and thickening the metal adjacent to said edge surfaces to the extent of from about 3% to about 10%, said upsetting and thickening being accomplished in a plane transverse of said tube by simultaneously restraining the outer surface of the tube thruout substantially its entire circumferential extent, exerting pressure on the outer surface of the gap-containing part of the tube which, if unresisted, would decrease the width of said gap and applying sufficient force to said edge surfaces to prevent said exteriorly applied force from decreasing the width of said gap and to upset inwardly and thicken the metal adjacent to said edges to the extent specified.

PAUL H. HEBRON.